United States Patent
Yoon et al.

(10) Patent No.: US 11,483,172 B2
(45) Date of Patent: Oct. 25, 2022

(54) INTEGRATED CONTROL METHOD AND SYSTEM FOR HOME APPLIANCE USING ARTIFICIAL INTELLIGENCE

(71) Applicant: LG ELECTRONICS INC., Seoul (KR)

(72) Inventors: Yoosool Yoon, Seoul (KR); Joonsei Lee, Seoul (KR); Donghun Kim, Seoul (KR); Dongwoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/077,774

(22) Filed: Oct. 22, 2020

(65) Prior Publication Data

US 2021/0194717 A1 Jun. 24, 2021

(30) Foreign Application Priority Data

Dec. 18, 2019 (KR) ........................ 10-2019-0169415

(51) Int. Cl.
*H04L 12/28* (2006.01)
*G06N 20/00* (2019.01)
*G06N 3/08* (2006.01)

(52) U.S. Cl.
CPC .......... *H04L 12/2816* (2013.01); *G06N 3/08* (2013.01); *G06N 20/00* (2019.01); *H04L 12/2829* (2013.01); *H04L 2012/285* (2013.01); *H04L 2012/2841* (2013.01)

(58) Field of Classification Search
CPC ............. H04L 12/2816; H04L 12/2829; H04L 2012/2841; H04L 2012/285; H04L 12/281; H04L 12/2807; H04L 12/2827; G06N 3/08; G06N 20/00; G06N 3/02
See application file for complete search history.

(56) References Cited

U.S. PATENT DOCUMENTS

2017/0310161 A1* 10/2017 Tokunaga ............... H02J 13/00
2019/0180603 A1*  6/2019 Kinney .................... G06F 3/167
2020/0213407 A1*  7/2020 Jung ...................... H04L 67/306

* cited by examiner

*Primary Examiner* — Charles R Kasenge
(74) *Attorney, Agent, or Firm* — Birch, Stewart, Kolasch & Birch, LLP

(57) ABSTRACT

Disclosed are an integrated control method and system for multiple home appliances using artificial intelligence. The integrated control method for multiple home appliance comprises: transmitting use information or state information of a user terminal to a server; determining, by the server, a type of an integrated control mode and whether to start the integrated control mode for the multiple home appliances which are registered in a user account and cooperate over a network based on the transmitted information; generating, by the server, multiple control commands for the multiple home appliances, respectively, based on the determined integrated control mode; providing, by the server, the multiple control commands to the user terminal; and controlling, by the user terminal, the multiple home appliances based on the multiple control commands over the network, respectively.

17 Claims, 10 Drawing Sheets

INTEGRATED CONTROL METHOD AND SYSTEM FOR HOME APPLIANCE USING ARTIFICIAL INTELLIGENCE

CROSS REFERENCE TO RELATED APPLICATION

The present application claims priority to Korean Patent Application No. 10-2019-0169415, filed Dec. 18, 2019, the entire contents of which is incorporated herein for all purposes by this reference.

BACKGROUND OF THE INVENTION

Field of the Invention

The present disclosure relates to an integrated control method and system for multiple home appliances using artificial intelligence. More particularly, the present disclosure relates to an integrated control method and system capable of simultaneously controlling multiple devices with respective control commands by using artificial intelligence.

Description of the Related Art

As technology has advanced, devices equipped with artificial intelligence (AI) have been widely introduced. In particular, home appliances to which Internet of Things (IoT) technology is applied so as to be connected to a network are also implemented in such a manner as to have artificial intelligence.

In an IoT environment, an intelligent Internet Technology (IT) service that collects and analyzes data generated by connected devices to create new value in human life may be provided. Through convergence and combination of existing IT and various industries, IoT may be applied to fields such as smart homes, smart buildings, smart cities, smart cars, smart appliances, and the like.

In the meantime, various home appliances for user convenience are provided in home. Various technologies have been proposed to make manipulation or control of the home appliances more convenient.

The foregoing is intended merely to aid in the understanding of the background of the present disclosure, and is not intended to mean that the present disclosure falls within the purview of the related art that is already known to those skilled in the art.

SUMMARY OF THE INVENTION

The present disclosure provides an integrated control method for multiple home appliances using artificial intelligence.

In addition, the present disclosure provides a system capable of providing integrated control for multiple home appliances by using artificial intelligence.

It is to be understood that technical problems to be solved by the present disclosure are not limited to the aforementioned technical problems and other technical problems which are not mentioned will be apparent from the following description to those skilled in the art.

According to several embodiments of the present disclosure, there is provided an integrated control method for multiple home appliances using artificial intelligence, the method including: transmitting use information or state information of a user terminal to a server; determining, on the basis of the transmitted information, whether to start an integrated control mode for the multiple home appliances which are registered in a user account and cooperate over a network, and a type of the integrated control mode; generating, on the basis of the determined integrated control mode, multiple control commands for the multiple home appliances, respectively; providing the multiple control commands to the user terminal; and controlling, by the user terminal, the multiple home appliances on the basis of the multiple control commands over the network, respectively.

In various embodiments of the present disclosure, the transmitting of the use information or the state information of the user terminal to the server may include patterning, by the user terminal, information on a time when the user terminal is used and providing the information to the server, and the determining of the type of the integrated control mode may include determining the type of the integrated control mode to be a wake-up mode or a sleep mode from the patterned information on the time when the user terminal is used.

In various embodiments of the present disclosure, the information on the time when the user terminal is used may include any one among: mobile information representing a time when a user uses the user terminal, and a type of application used at the time; and use information of the multiple home appliances that the user uses.

In various embodiments of the present disclosure, the patterning of the use information of the user terminal may include estimating a wake-up time or a bedtime from the mobile information and comparing the wake-up time or the bedtime estimated from the mobile information with a wake-up time or a bedtime estimated from the use information of the home appliance.

In various embodiments of the present disclosure, the state information of the user terminal may include position information of a user, and the determining of whether to start the integrated control mode, and the type of the integrated control mode may include starting an away mode by using the position information of the user, when the user terminal deviates from a predetermined position for a predetermined time or longer.

In various embodiments of the present disclosure, the controlling, by the user terminal, of the multiple home appliances on the basis of the multiple control commands, respectively, may include setting an operation according to the control commands, ignoring an existing operation mode set before the control commands are provided.

In various embodiments of the present disclosure, the controlling, by the user terminal, of the multiple home appliances on the basis of the multiple control commands, respectively, may include: receiving an user input by using the user terminal; determining whether the user input is an input for changing the determined integrated control mode; generating, when a result of the determination is that the user input is the input for changing the mode, control commands corresponding to a changed integrated control mode; and controlling the multiple home appliances with the generated control commands, respectively.

In various embodiments of the present disclosure, the server may generate or modify, on the basis of the changed integrated control mode, a user preference characteristic learning model for the integrated control mode for the multiple home appliances.

According to several embodiments of the present disclosure, there is provided an integrated control system for multiple home appliances using artificial intelligence, the system including: a user terminal recording use information or state information of the user terminal; and a server receiving a record of using or the state information from the user terminal, and determining, on the basis of the record of using or the state information, whether to start an integrated control mode for the multiple home appliances which are registered in a user account and cooperate over a network, and a type of the integrated control mode, wherein the server generates, on the basis of the determined integrated control mode, multiple control commands for the multiple home appliances, respectively, and provides the multiple control commands to the user terminal, and the user terminal controls the multiple home appliances on the basis of the multiple control commands over the network, respectively.

In various embodiments of the present disclosure, the user terminal may pattern information on a time when the user terminal is used and may provide the information to the server, and the server may determine the type of the integrated control mode to be a wake-up mode or a sleep mode from the patterned information on the time when the user terminal is used.

In various embodiments of the present disclosure, the user terminal may estimate a wake-up time or a bedtime from the mobile information, and may compare the wake-up time or the bedtime estimated from the mobile information with a wake-up time or a bedtime estimated from the use information of the home appliance, thereby patterning the use information of the user terminal.

In various embodiments of the present disclosure, the state information of the user terminal may include position information of a user, and the server may start an away mode by using the position information of the user, when the user terminal deviates from a predetermined position for a predetermined time or longer.

In various embodiments of the present disclosure, the user terminal may estimate a wake-up time or a bedtime from the mobile information, and may compare the wake-up time or the bedtime estimated from the mobile information with a wake-up time or a bedtime estimated from the use information of the home appliance, thereby patterning the use information of the user terminal.

In various embodiments of the present disclosure, the state information of the user terminal may include position information of a user, and the server may start an away mode by using the position information of the user, when the user terminal deviates from a predetermined position for a predetermined time or longer.

In various embodiments of the present disclosure, the user terminal may set an operation according to the control commands, ignoring an existing operation mode set for the multiple home appliances before the control commands are provided.

In various embodiments of the present disclosure, the server may generate or modify, on the basis of the changed integrated control mode, a user preference characteristic learning model for the integrated control mode for the multiple home appliances.

Details of other embodiments are included in the detailed description and the drawings.

In the integrated control method for multiple home appliances using artificial intelligence according to embodiments of the present disclosure, an integrated control mode appropriate for user's preference characteristics is determined to control the multiple home appliance, thereby enhancing the user experience of the home appliance 300.

Effects that may be obtained from the present disclosure will not be limited to only the above described effects. In addition, other effects which are not described herein will become apparent to those skilled in the art from the following description.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Figure 1:
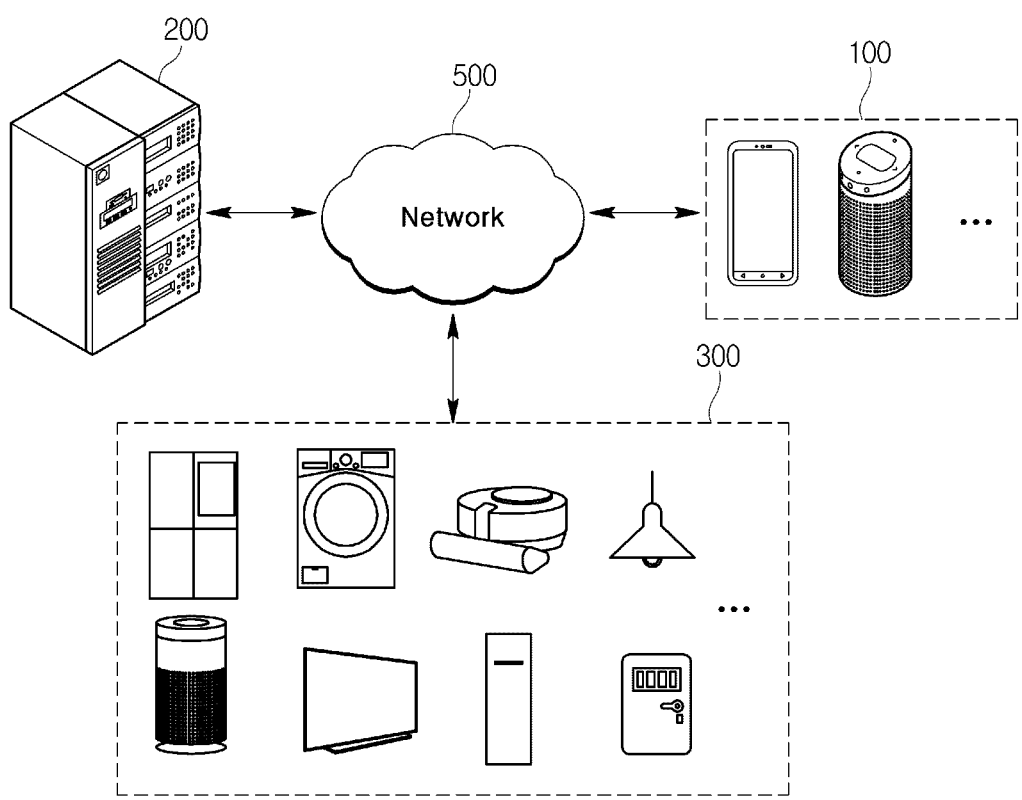
FIG. 1 is a diagram showing an integrated control system for multiple home appliances using artificial intelligence according to several embodiments of the present disclosure.

Hereinafter, embodiments described in the specification will be described in detail with reference to the accompanying drawings. Regardless of reference numerals, the same or similar elements are denoted by the same reference numerals, and a duplicated description thereof will be omitted. The suffix "module" and "unit" for the element used in the following description is merely intended to facilitate description of the specification, and the suffix itself does not have a meaning or function distinguished from others. In addition, in describing the embodiments described in the specification, if it is decided that the detailed description of the known art related to the present disclosure makes the subject matter of the present disclosure unclear, the detailed description will be omitted. In addition, the accompanying drawings are only to easily understand an embodiment described in the specification. It is to be understood that the technical idea described in the specification is not limited by the accompanying drawings, but includes all modifications, equivalents, and substitutions included in the spirit and the scope of the present disclosure.

Terms including ordinal numbers, such as "first", "second", etc. can be used to describe various elements, but the elements are not to be construed as being limited to the terms. The terms are only used to differentiate one element from other elements.

It will be understood that when an element is referred to as being "coupled" or "connected" to another element, it can be directly coupled or connected to the other element or intervening elements may be present therebetween. In contrast, it will be understood that when an element is referred to as being "directly coupled" or "directly connected" to another element, there are no intervening elements present.

FIG. 1 is a diagram showing an integrated control system for multiple home appliances using artificial intelligence according to several embodiments of the present disclosure.

Referring to FIG. 1, shown is a configuration of an integrated control system 1 for multiple home appliances, in which a user terminal (user equipment) 100, a server 200, and multiple home appliances 300 are connected over a network 500. The user terminal 100 is for controlling the home appliance 300, and the server 200 generates a control command corresponding to an integrated control mode for multiple home appliances 300, and provides the control command.

The integrated control mode of the home appliance described in the specification refer to a mode in which an operation mode may be integrally set for multiple home appliances that are registered in a user account and cooperate over the network 500. That is, when a particular condition is satisfied, multiple home appliances 300 are controlled by the server 200 or the user terminal 100 to perform a predetermined operation.

Examples of the user terminal 100 may include a mobile phone, a smart phone, a tablet PC, Ultrabook, a wearable device (for example, a watch-type artificial intelligence device (smartwatch), a glass-type artificial intelligence device (smart glass), a head mounted display (HMD)), and the like.

The user terminal 100 will be described later in detail with reference to FIG. 2.

The server 200 may provide various services related to an artificial intelligence model to the user terminal 100 in connection with an artificial intelligence model described in an embodiment of the present disclosure.

The server 200 performing the integrated control method for the home appliance according to several embodiments of the present disclosure may use artificial intelligence (AI) in connection with the determination of the integrated control mode.

Artificial intelligence refers to the field of researching artificial intelligence or the methodology to create the same, and machine learning refers to the field of defining various problems in the field of artificial intelligence and researching the methodology for solving the problems. Machine learning is defined as an algorithm that improves the performance of an operation by performing a consistent experience for the operation.

An artificial neural network (ANN) is a model used in machine learning, and may refer to an overall model having a problem-solving ability, which is composed of artificial neurons (nodes) constituting a network through synaptic coupling. The artificial neural network may be defined by the followings: a connection pattern between neurons in different layers; a learning process of updating a model parameter; and an activation function generating an output value.

The artificial neural network may include an input layer, an output layer, and optionally one or more hidden layers. Each layer may include one or more neurons, and the artificial neural network may include a synapse that connects neurons. In the artificial neural network, each neuron may output a function value of an activation function for input signals input through a synapse, a weight, and a bias.

The model parameter refers to a parameter determined through learning, and includes a weight of a synapse connection, a bias of a neuron, and the like. In addition, a hyper-parameter refers to a parameter that needs to be set in a machine learning algorithm before performing learning, and includes a learning rate, the number of times for repetition, a size of a mini-batch, an initialization function, and the like.

An objective of performing learning by an artificial neural network is to determine a model parameter that minimizes a loss function. The loss function may be used as an index for determining an optimum model parameter in a learning process of the artificial neural network.

Machine learning may be classified into supervised learning, unsupervised learning, and reinforcement learning according to a learning method.

Supervised learning may refer to a method of making an artificial neural network learn, with a label provided which is related to learning data. The label may refer to a right answer (or result value) that should be estimated by the artificial neural network when the learning data is input to the artificial neural network. Unsupervised learning may refer to a method of making an artificial neural network learn, without a label provided which is related to learning data. Reinforcement learning may refer to a learning method in which an agent defined under a particular environment learns to select an action or a sequence of actions for maximizing an accumulated reward in each state.

Machine learning implemented in a deep neural network (DNN) including multiple hidden layers, among artificial neural networks, is referred to as deep learning, and the deep learning is a part of the machine learning. Hereinafter, machine learning is used as including deep learning.

In addition, the user terminal 100 performing the integrated control method for the home appliance according to several embodiments of the present disclosure may use the above-described artificial intelligence.

In this specification, the server 200 is described as referring to a set of computers that are connected over the network 500 and installed at a place other than the home. However, the server 200 of the present disclosure is not limited to this technical concept. Examples of the server 200 may include a device, such as a home server, a home hub, a home gateway, and the like, installed in the home.

In the case where the server 200 is a home server installed in the home, the network 500 may be a wireless network installed in the home, for example, Wi-Fi.

The home appliance 300 is a type of embedded system, and may receive an integrated control command from the user terminal 100 through a wireless communication function, and may perform each function, accordingly.

Examples of the home appliance 300 shown in FIG. 1 may include a washing machine, a refrigerator, an air purifier, a TV, a lamp, a door lock, and the like, but the present disclosure is not limited thereto.

The network 500 may be any appropriate communication network including wired and wireless networks, for example, a local area network (LAN), a wide area network (WAN), the Internet, an intranet, and an extranet; a mobile network, for example, a cellular network, 3G, LTE, 5G, Wi-Fi, and an AD-HOC network; and combination thereof.

The network 500 may include connection of network elements, such as a hub, a bridge, a router, a switch, and a gateway. The network 500 may include one or more connected networks, for example, a multi-network environment, including a public network, such as the Internet, and a private network, such as a secure private network of a corporation. Access to the network 500 may be provided over one or more wired or wireless access networks.

The user terminal 100 may transmit and receive data to the server 200, which is a learning device, over a 5G network. The user terminal 100 may perform data communication with the server 200 over the 5G network by using at least one service among enhanced mobile broadband (eMBB), ultra-reliable and low latency communications (URLLC), and massive machine-type communications (mMTC).

The enhanced mobile broadband (eMBB) is a mobile broadband service through which multimedia contents, wireless data access, and the like are provided. In addition, more enhanced mobile services such as hot spot, broadband coverage, and the like for handling explosively increasing mobile traffic may be provided through the eMBB. Through the hot spot, a large amount of traffic is handled in an area with low user mobility and high density. Through the broadband coverage, a wide and stable wireless environment and user mobility may be guaranteed.

The ultra-reliable and low latency communications (URLLC) service defines much stricter requirements than the existing LTE in terms of reliability of data transmission and reception and transmission delay. The URLLC service corresponds to a 5G service for production process automation in industrial sites, telemedicine, telesurgery, transportation, security, and the like.

The massive machine-type communications (mMTC) is a service that requires transmission of a relatively small amount of data and is not sensitive to transmission delay. Much more terminals, such as sensors, and the like, than general mobile phones may access a wireless access network simultaneously by the mMTC. In this case, costs of the communication modules of the terminals need to be cheap, and improved power efficiency or power saving technology are required so that the terminals may operate for years without battery replacement and recharging.

Figure 2:
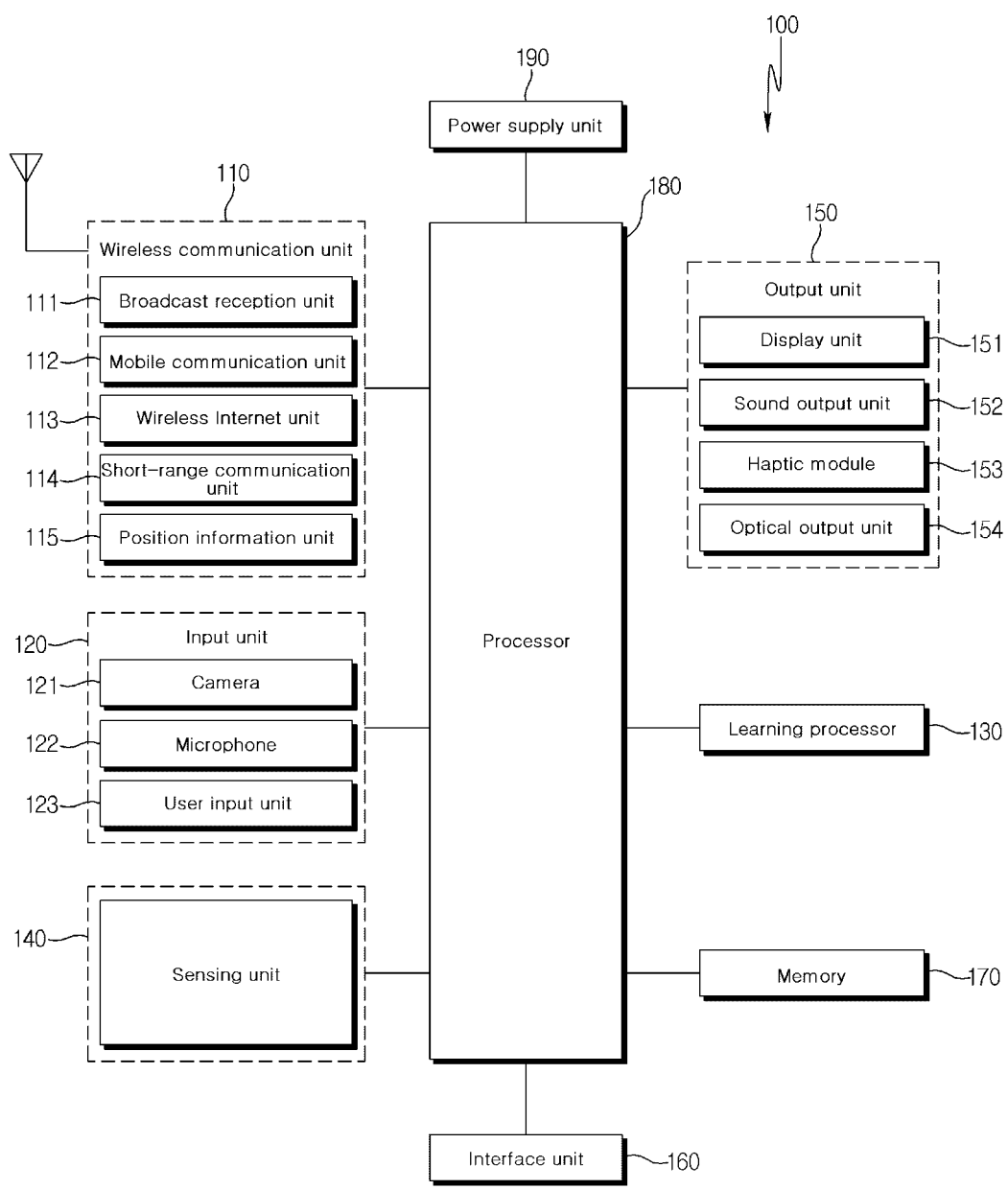
FIG. 2 is a diagram showing the user terminal capable of performing an integrated control method for multiple home appliances using artificial intelligence according to several embodiments of the present disclosure.

FIG. 2 is a diagram showing the user terminal 100 capable of performing an integrated control method for multiple home appliances using artificial intelligence according to several embodiments of the present disclosure.

Referring to FIG. 2, the user terminal 100 may include a wireless communication unit 110, an input unit 120, a learning processor 130, a sensing unit 140, an output unit 150, an interface unit 160, a memory 170, a processor 180, and a power supply unit 190.

The user terminal 100 according to an embodiment of the present disclosure may perform a function of a control terminal controlling the home appliance 300. The home appliance 300 may receive a control command according to the integrated control mode through the user terminal 100, and may perform an operation according to the control command.

A wireless communication unit 110 may include at least one among a broadcast reception unit 111, a mobile communication unit 112, a wireless Internet unit 113, a short-range communication unit 114, and a position information unit 115.

The broadcast reception unit 111 may receive a broadcast signal and/or broadcast-related information from an external broadcast management server through a broadcast channel.

The mobile communication unit 112 may transmit and receive a wireless signal from at least one among a base station, an external terminal, and a server over a mobile communication network that are established according to technical standards or communications methods for mobile communication (for example, The Global System for Mobile communication (GSM), code-division multiple access (CDMA), code-division multiple access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), and the like). However, the present disclosure is not limited to the above-described examples of the communication methods.

The wireless Internet unit 113 is a module for wireless Internet access, and may be built in the user terminal 100 or provided as an external module. The wireless Internet unit 113 may be configured to transmit and receive wireless signals over a communication network according to wireless Internet technologies.

Examples of the wireless Internet technologies include a wireless LAN (WLAN), Wi-Fi, Wi-Fi Direct, Digital Living Network Alliance (DLNA), wireless broadband (WiBro), World Interoperability for Microwave Access (WiMAX), High Speed Downlink Packet Access (HSDPA), High Speed Uplink Packet Access (HSUPA), Long Term Evolution (LTE), Long Term Evolution-Advanced (LTE-A), and the like. However, the present disclosure is not limited to the above-described examples of the wireless Internet technical stands.

In the integrated control system for the home appliance according to several embodiments of the present disclosure, use information or state information of the user terminal 100 recorded by the user terminal 100 may be transmitted to the server 200 over the network 500 connected using the mobile communication unit 112 or the wireless Internet unit 113.

The short-range communication unit 114 is for short-range communication, and may support short-range communication by using at least one among Bluetooth™, radio-frequency identification (RFID), Infrared Data Association (IrDA), ultra-wideband (UWB), ZigBee, near-field communication (NFC), Wi-Fi, Wi-Fi Direct, Wireless Universal Serial Bus (Wireless USB) technologies. However, the present disclosure is not limited to the above-described examples of the short-range communication methods.

The position information unit 115 is a module for acquiring the position (or current position) of the user terminal 100, and representative examples of the position information unit include a Global Positioning System (GPS) module or a Wi-Fi module. For example, using the GPS module, the user terminal 100 may acquire the position of the user terminal 100 by using a signal transmitted from a GPS satellite.

The position information of the user terminal 100 recorded by the position information unit 115 may be temporarily stored in the memory 170. As will be described later, this is to use the position information of the user terminal 100 so as to determine whether to start the integrated control mode. Afterwards, the position information of the user terminal 100 may be transmitted to the server 200 over the network 500.

The input unit 120 may include a camera 121 for inputting an image signal, a microphone 122 for receiving an audio signal, and a user input unit 123 for receiving information from a user.

Speech data or image data collected by the input unit 120 may be analyzed by the processor 180 to be processed as a user's control command.

The input unit 120 is for input of video information (or signal), audio information (or signal), data, or information input from the user. For input of the video information, the user terminal 100 may include one or multiple cameras 121.

The camera 121 processes image frames such as still images, video, or the like acquired by an image sensor in a video call mode or a shooting mode. The processed image frame may be displayed on a display unit 151 or stored in a memory 170.

The microphone 122 processes external sound signals into electrical speech data. The user terminal 100 may receive a user's speech command through the microphone 122.

The processed speech data may be used in various ways depending on the function being performed (or an application program in execution) by the user terminal 100. In the meantime, in the microphone 122, various noise-removal algorithms for removing noise that occurs in the process of receiving an external sound signal may be implemented.

The user input unit 123 is for receiving information from a user. When information is input through the user input unit 123, the processor 180 controls the operation of the user terminal 100 according to the input information. The user input unit 123 may include a touch input means and a mechanical input means (or a mechanical key, for example, a button, a dome switch, a jog wheel, a jog switch, etc. positioned on the front/rear or the side of the mobile terminal 100).

For example, the touch input means may include a virtual key, a soft key, or a visual key displayed on the display unit 151 through software processing, or may include a touch key placed on a portion other than the display unit 151. In the meantime, the virtual key or visual key may have various forms and may be displayed on a touch screen. For example, the virtual key or visual key may be formed of a graphic, text, icon, video, or a combination thereof.

The learning processor 130 may be configured to perform data mining, a data analysis, intelligent decision making, and a machine learning algorithm, and to receive, classify, store, and output information to be used for the technologies.

The learning processor 130 may include one or more memory units configured to store data that is received, detected, sensed, generated, predefined, or differently output by the user terminal 100 using artificial intelligence; or data that is received, detected, sensed, generated, predefined, or differently output by another component, device, user terminal 100, or a device communicating with the user terminal 100.

The learning processor 130 may include a memory integrated with or implemented in the user terminal 100. In some embodiments, the learning processor 130 may be implemented using the memory 170.

Alternatively or additionally, the learning processor 130 may be implemented by using a memory related to the user terminal 100, such as an external memory directly combined to the user terminal 100, or a memory maintained at a server communicating with the user terminal 100.

In another embodiment, the learning processor 130 may be implemented by using a memory maintained in a cloud computing environment, or a location of another remote memory that is accessible by the user terminal 100 through a communication method, such as a network.

Generally, the learning processor 130 may be configured to store data in one or more databases to identify, index, categorize, manipulate, store, fine, and output data for use in supervised or unsupervised learning, data mining, predictive analytics, or other machines.

The information stored in the learning processor 130 may be used by the processor 180 or one or more different controllers of home appliances, using any of different types of data analysis algorithms and machine learning algorithms.

Examples of such algorithms includes a k-nearest neighbor system, fuzzy logic (for example, possibility theory), a neural network, a Boltzmann machine, vector quantization, a pulsed neural network, a support vector machine, a maximum margin classifier, hill climbing, an inductive logic system, a Bayesian network, a Petri net (for example, a finite state machine, a mealy machine, and a Moore finite state machine), a classifier tree (for example, a perceptron tree, a support vector tree, a Markov tree, a decision tree forest, and a random forest), pandemonium model and system, artificial fusion, sensor fusion, image fusion, reinforcement learning, augmented reality, pattern recognition, automated planning, and the like.

The processor 180 may control the operation of the user terminal 100 according to the input information.

The processor 180 may determine or predict at least one executable operation of a user terminal on the basis of information determined or generated by using a data analysis and a machine learning algorithm. To this end, the processor 180 may request, find, receive, or use data of the learning processor 130, and may control the user terminal so that a predicted operation or an operation determined to be preferable, of the at least one executable operation is performed.

The processor 180 may perform various functions for implementing intelligent emulation (specifically, a knowledge-based system, an inference system, and a knowledge acquisition system). This may be applied to various types of systems (for example, a fuzzy logic system) including an adaptive system, a machine learning system, an artificial neural network, and the like.

The processor 180 may also include a sub-module that enables an operation accompanied by speech and natural language speech processing, such as an I/O processing module, an environment condition module, a speech-to-text (STT) processing module, a natural language processing (NLP) module, a workflow processing module, and a service processing module.

Each of the sub-modules may have access to one or more systems or data and models at a speech recognition device, or a subset or superset thereof. Further, each of the sub-modules may provide various functions including a vocabulary index, user data, a workflow model, a service model, and an automatic speech recognition (ASR) system.

In another embodiment, another aspect of the processor 180 or the user terminal 100 may be implemented with the sub-module, system, or data and model.

In some examples, using data of the learning processor 130, the processor 180 may be configured to detect and sense requirements on the basis of the user's intent or a contextual condition expressed in a user input or a natural language input.

The processor 180 may actively elicit and acquire information required to fully determine the requirements on the basis of the contextual condition or the user's intent. For example, the processor 180 may actively elicit information required to determine the requirements, by analyzing historical data that includes historical input and output, pattern matching, unambiguous words, input intent, etc.

The processor 180 may determine a flow of tasks for executing a function that responds to the requirements on the basis of the contextual condition or the user's intent.

The processor 180 may be configured to collect, sense, extract, detect, and/or receive a signal or data used for a data analysis and machine learning operation, through one or more sensing components in the user terminal, in order to collect information for processing and storage by the learning processor 130.

Collection of information may include sensing information through a sensor, extracting information stored in the memory 170, or receiving information from another artificial intelligence device, entity, or external storage device through a communication means.

The processor 180 may collect and store use history information of a user terminal of the present disclosure. The processor 180 may determine the best match for performing a particular function, by using the stored use history information and predictive modeling.

The processor 180 may receive or sense the information on the surrounding environment or other types of information through the sensing unit 140.

The processor 180 may receive a broadcast signal and/or broadcast-related information, a wireless signal, and wireless data through the wireless communication unit 110.

The processor 180 may receive image information (or a signal corresponding thereto), audio information (or a signal corresponding thereto), data, or user input information from the input unit 120.

The processor 180 may collect information in real time, may process or classify information (for example, a knowledge graph, a command policy, a personalization database, a dialogue engine, etc.), and may store the processed information in the memory 170 or the learning processor 130.

When the operation of the user terminal 100 is determined on the basis of a data analysis, and machine learning algorithm and technology, the processor 180 controls the elements of the user terminal 100 so as to execute the determined operation. The processor 180 may then perform the determined operation by controlling the terminal according to a control command.

When a particular operation is performed, the processor 180 analyzes history information indicating execution of the particular operation through a data analysis and machine learning algorithm and technique, and updates the previously-learned information on the basis of the analyzed information.

Accordingly, the processor 180, in combination with the learning processor 130, may enhance, on the basis of the updated information, the accuracy of future performance of the data analysis and the machine learning algorithm and technique.

The sensing unit 140 may include one or more sensors sensing at least one among information in the mobile user terminal 100, information on a surrounding environment around the mobile user terminal 100, and user information.

For example, the sensing unit 140 may include at least one among a proximity sensor 141, an illumination sensor 142, a touch sensor, an acceleration sensor, a magnetic sensor, a gravity sensor (G-sensor), a gyroscope sensor, a motion sensor, an RGB sensor, an infrared sensor (IR sensor), a finger scan sensor, an ultrasonic sensor, an optical sensor (for example, the camera 121), the microphone 122, a battery gauge, an environmental sensor (for example, a barometer, a hygrometer, a thermometer, a radioactivity sensor, a heat sensor, a gas sensor, etc.), and a chemical sensor (for example, an electronic nose, a healthcare sensor, a biometric sensor, etc.). In the meantime, the mobile user terminal 100 described in this specification may use a combination of information sensed by at least two sensors of these sensors.

An output unit 150 is for generating output related to visual, auditory, tactile senses, etc. and may include at least one among the display unit 151, a sound output unit 152, a haptic module 153, and an optical output unit 154.

The display unit 151 displays (outputs) information processed by the user terminal 100. For example, the display unit 151 may display execution-screen information of an application program run on the user terminal 100, or User Interface (UI) and Graphic User Interface (GUI) information according to the execution-screen information.

The display unit 151 and a touch sensor may have an inter-layered structure or may be integrated, thereby implementing a touch screen. This touch screen may serve as the user input unit 123 that provides an input interface between the user terminal 100 and the user and may provide an output interface between the user terminal 100 and the user.

In particular, the display unit 151 according to several embodiments of the present disclosure may function as an interface through which the user terminal 100 receives a user input to perform the integrated control method for the home appliance 300. That is, details of the integrated control mode are displayed through the display unit 151, and the user inputs a start command, so that the control command for the home appliance 300 may be provided.

The sound output unit 152 may output audio data received from the wireless communication unit 110 or stored in the memory 170, in a call signal reception mode, a call mode, a recording mode, a speech recognition mode, a broadcast reception mode, or the like. The sound output unit 152 may include at least one among a receiver, a speaker, and a buzzer.

The haptic module 153 generates various tactile effects that the user feels. A representative example of the tactile effects generated by the haptic module 153 may be vibration.

The optical output unit 154 outputs a signal for informing about the occurrence of an event, by using light of a light source of the user terminal 100. Examples of the event generated in the user terminal 100 may include receiving a message, receiving a call signal, a missed call, an alarm, schedule notification, receiving an email, receiving information through an application, and the like.

The interface unit 160 serves as a passage to various types of external devices connected to the user terminal 100. The interface unit 160 may include at least one among a wired/wireless headset port, an external-charger port, a wired/wireless data port, a memory card port, a port connecting a device equipped with an identification module, an audio input/output (I/O) port, a video input/output (I/O) port, and an earphone port. In the user terminal 100, in response to connection between an external device and the interface unit 160, appropriate control related to the connected external device may be performed.

In the meantime, the identification module is a chip storing various types of information for authenticating the use authority of the user terminal 100, and examples of the identification module may include a user identify module (UIM), a subscriber identity module (SIM), a universal subscriber identity module (USIM), or the like. A device (hereinafter, referred to as an "identification device") equipped with the identification module may be manufactured in a form of a smart card. Therefore, the identification device may be connected to the user terminal 100 through the interface unit 160.

The memory 170 may be for storing data supporting various functions of the user terminal 100.

The memory 170 may store a number of application programs or applications running on the user terminal 100, data for operation of the user terminal 100, instructions, and data (for example, at least one algorithm information for machine learning, etc.) for operation of the learning processor 130.

The memory 170 may include a volatile memory or a non-volatile memory. Examples of the non-volatile memory include read-only memory (ROM), a programmable ROM (PROM), an electrically programmable ROM (EPROM), an electrically erasable and programmable ROM (EEPROM), flash memory, phase-change RAM (PRAM), magnetic RAM (MRAM), resistive RAM (RRAM), ferroelectric RAM (FRAM), etc. The volatile memory may include at least one of various memories, such as dynamic RAM (DRAM), static RAM (SRAM), synchronous DRAM (SDRAM), phase-change RAM (PRAM), magnetic RAM (MRAM), resistive RAM (RRAM), ferroelectric RAM (Fe-RAM), etc.

In the integrated control system for the home appliance according to several embodiments of the present disclosure, use record information or state information of the user terminal 100 by the user may be temporarily or non-temporarily stored in the memory 170. The use record information or the state information of the user terminal 100 may be loaded from the memory 170, and may be provided to the server 200 for determination of the integrated control mode later.

Generally, the processor 180 controls the overall operation of the user terminal 100, in addition to the operations related to the application program. The processor 180 may process input or output signals, data, information, etc. or may execute the application program stored in the memory 170 through the above-described elements, thereby providing or processing information or a function appropriate for the user.

In addition, the processor 180 may control at least one or some of the elements described with reference to FIG. 1, so as to run the application program stored in the memory 170. Further, the processor 180 may operate at least two of the elements included in the user terminal 100 in combination so as to operate the application program.

Under the control of the processor 180, the power supply unit 190 may receive external power or internal power to supply the power to each of the elements included in the user terminal 100.

The power supply unit 190 may include, for example, a battery, and the battery may be a built-in battery or a replaceable battery. Alternatively, the power supply unit 190 may an adapter that receives AC power, converts the AC power into DC power, and supplies the DC power to the user terminal 100.

In the meantime, as described above, the processor 180 controls the operations related to an application program, and generally the overall operation of the user terminal 100. For example, when a state of the user terminal 100 meets a set condition, the processor 180 may set a lock state in which input of the user's control command to applications is limited, or may stop the lock state.

Figure 3:
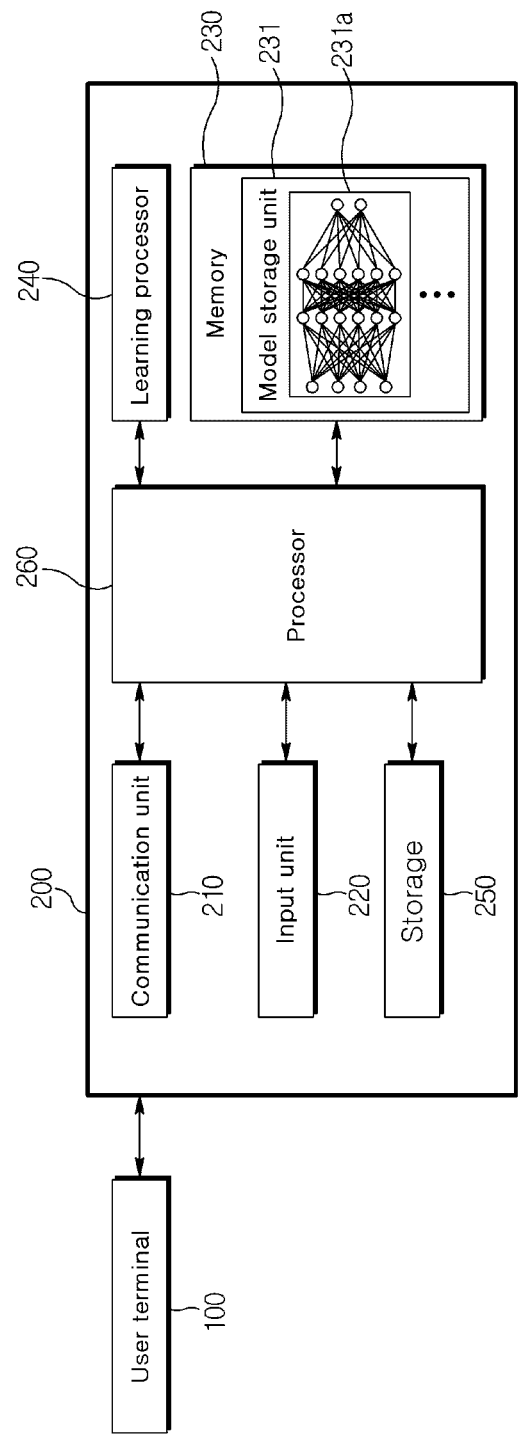
FIG. 3 is a diagram showing the server included in the integrated control system for the home appliance according to several embodiments of the present disclosure.

FIG. 3 is a diagram showing the server 200 included in the integrated control system for the home appliance according to several embodiments of the present disclosure.

Referring to FIG. 3, the server 200 may include a communication unit 210, an input unit 220, a memory 230, a learning processor 240, a storage 250, a processor 260, and the like.

The communication unit 210 may correspond to a component including the wireless communication unit 110 and the interface unit 160 included in the user terminal 100 of FIG. 2. That is, the communication unit 210 may transmit and receive data to other devices through wired/wireless communication or an interface.

The input unit 220 is a component corresponding to an input unit 120 of FIG. 2, and may acquire data by receiving data through the communication unit 210.

The input unit 220 may acquire input data, and the like for acquiring output by using training data for model learning and a trained model.

The input unit 220 may acquire raw input data. In this case, the processor 260 may preprocess the acquired data to generate training data which may be input for model learning, or preprocessed input data.

Herein, preprocessing for the input data performed by the input unit 220 may refer to extracting an input feature point from the input data.

The memory 230 is a component corresponding to the memory 170 of FIG. 2. The memory 230 may include a model storage unit 231, a database 232, and the like. The memory 230 may temporarily store data processed by the processor 260.

The model storage unit 231 stores a model that is in the middle of learning through the learning processor 240, or a trained model (or an artificial neural network 231*a*). When the model is updated through learning, the model storage unit 231 stores the updated model.

Herein, when necessary, the model storage unit 231 may store the trained model in multiple versions divided according to a learning time point, a learning progress degree, or the like.

The artificial neural network 231*a* shown in FIG. 3 is merely an example of an artificial neural network including multiple hidden layers, and the artificial neural network of the present disclosure is not limited thereto.

The artificial neural network 231*a* may be implemented in hardware, software, or combination thereof. When a part or the entire of the artificial neural network 231*a* is implemented in software, one or more instructions constituting the artificial neural network 231*a* may be stored in the memory 230.

The database 232 may store the input data acquired by the input unit 220, learning data (or training data) used for model learning, learning history of a model, and the like.

The input data stored in the database 232 may be data processed to be appropriate for model learning, as well as raw input data itself.

The server 200 included in the integrated control system for the home appliance according to several embodiments of the present disclosure may store user account information. The user account information stored in the server 200 will be described later in detail with reference to FIG. 7.

The learning processor 240 is a component corresponding to the learning processor 130 of FIG. 2. The learning processor 240 may make the artificial neural network 231*a* train (or learn) using training data or a training set.

The learning processor 240 may directly acquire the data preprocessed from the input data acquired by the processor 260 through the input unit 220 so as to perform learning for the artificial neural network 231a, or may acquire the preprocessed input data stored in the database 232 so as to perform learning for the artificial neural network 231a.

Specifically, the learning processor 240 may repeatedly make the artificial neural network 231a learn with the above-described various learning techniques, thereby determining the optimized model parameters of the artificial neural network 231a.

In this specification, an artificial neural network of which a parameter is determined by performing learning with training data may be referred to as a learning model or trained model.

Herein, the learning model may infer a result value while being loaded in the server 200 of the artificial neural network, or may be transmitted to another device, such as the user terminal 100, through the communication unit 210 and may be loaded in the device.

In addition, when the learning model is updated, the updated learning model is transmitted to another device, such as the user terminal 100, through the communication unit 210 and loaded in the device.

The storage 250 may store a program and data required for the operation of the server 200. For example, the storage 250 may store program data related to a control command corresponding to the integrated control mode for the home appliance, and when the program is executed by the processor 260, the storage 250 provides the program to the memory 230.

In addition, the storage 250 may store data related to a user account and information on multiple home appliances registered for each user. As will be described later, the server 200 may load the information on the home appliance registered in the user account. Herein, the processor 260 may load the information on the home appliance registered in the user account, from the storage 250, and may provide the information to the memory 230.

In addition, the server 200 may evaluate the artificial intelligence model. After the evaluation, the server 200 may update the artificial intelligence model for better performance, and may provide the updated artificial intelligence model to the user terminal 100. Herein, the user terminal 100 may perform a series of steps performed by the server 200, in a local area alone or through communication with the server 200 together.

For example, the user terminal 100 may make the artificial intelligence model learn a user's personal pattern through learning of user's personal data, thereby updating the artificial intelligence model downloaded from the server 200.

Figure 4:
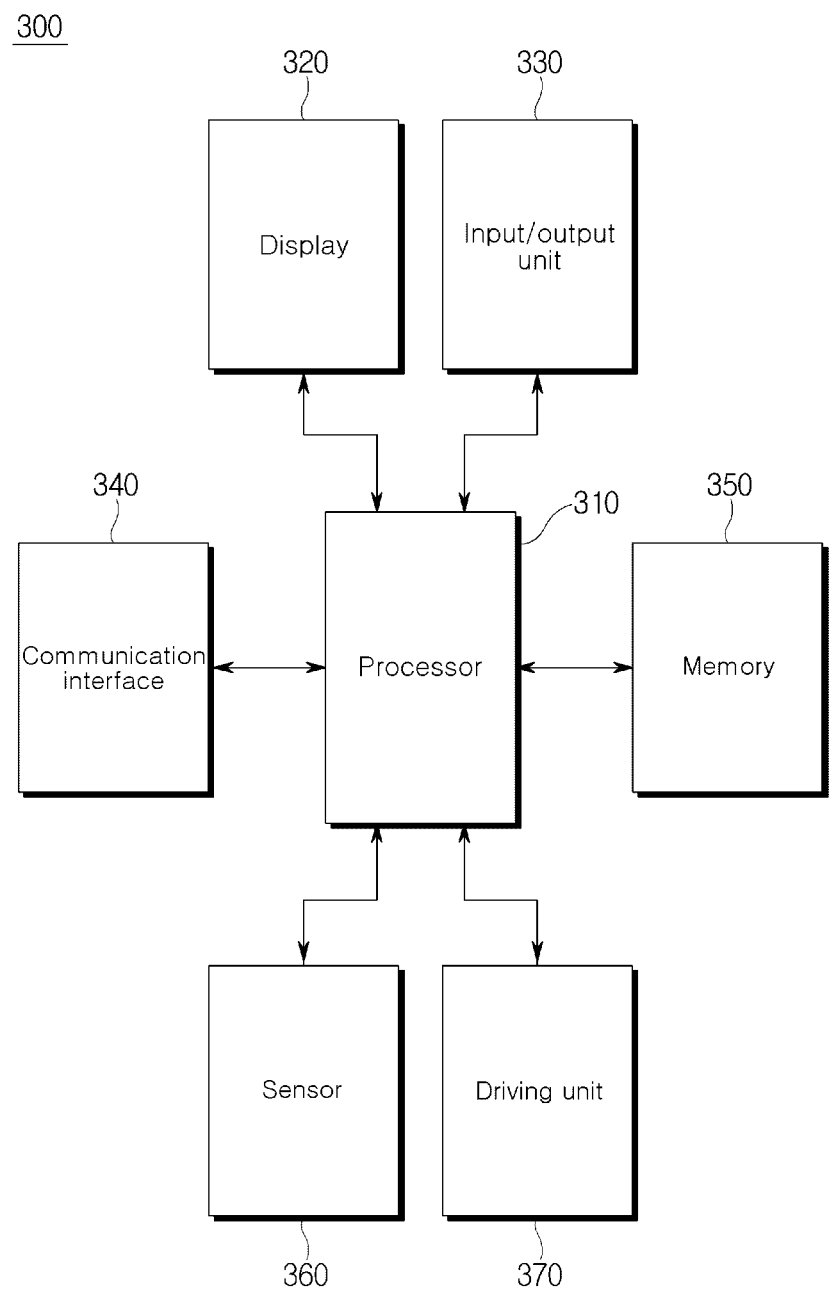
FIG. 4 is a diagram showing a home appliance controlled by an integrated control system for multiple home appliances using artificial intelligence according to several embodiments of the present disclosure.

FIG. 4 is a diagram showing a home appliance controlled by an integrated control system for multiple home appliances using artificial intelligence according to several embodiments of the present disclosure.

Referring to FIG. 4, the home appliance 300 controlled by the integrated control method for multiple home appliances according to several embodiments of the present disclosure may include a processor 310, a display 320, an input/output unit 330, a communication interface 340, a memory 350, a sensor 360, and a driving unit 370.

The processor 310 may control the operation of the home appliance 300. Specifically, when a control command for the home appliance 300 is provided through the communication interface 340 connected to the user terminal 100, the processor 310 controls the operation of the home appliance 300 on the basis of the control command.

The display 320 may display an internal state or data of the home appliance 300. In several embodiments, the user may control the home appliance 300 through a user interface displayed on the display 320.

The input/output unit 330 may include at least one among an input unit, such as a camera for video signal input, a microphone for receiving an audio signal, and the like; and/or a sound output unit, a haptic module, and an optical output unit that are output units for generating output related to visual, auditory, tactile senses, and the like.

The communication interface 340 may include a transmitter and a receiver. The home appliance 300 may be connected to the user terminal 100 or the server 200 by accessing the network 500 through the communication interface 340.

The home appliance 300 connected to the user terminal 100 or the server 200 may receive a control command required for driving the home appliance 300, through the communication interface 340. Use information of the home appliance 300 of the user may also be transmitted to the user terminal 100 or the server 200 through the communication interface 340.

The communication interface 340 may use, for example, a wireless Internet standard, such as a wireless LAN (WLAN), Wi-Fi, Wi-Fi Direct, Digital Living Network Alliance (DLNA), wireless broadband (WiBro), World Interoperability for Microwave Access (WiMAX), High Speed Downlink Packet Access (HSDPA), High Speed Uplink Packet Access (HSUPA), Long Term Evolution (LTE), Long Term Evolution-Advanced (LTE-A), and the like, but the present disclosure is not limited to the above-described examples of the wireless Internet technical standards.

The memory 350 may include a volatile memory or a non-volatile memory. Examples of the non-volatile memory include read-only memory (ROM), a programmable ROM (PROM), an electrically programmable ROM (EPROM), an electrically erasable and programmable ROM (EEPROM), flash memory, phase-change RAM (PRAM), magnetic RAM (MRAM), resistive RAM (RRAM), ferroelectric RAM (FRAM), etc. The volatile memory may include at least one of various memories, such as dynamic RAM (DRAM), static RAM (SRAM), synchronous DRAM (SDRAM), phase-change RAM (PRAM), magnetic RAM (MRAM), resistive RAM (RRAM), ferroelectric RAM (FeRAM), etc.

Examples of the sensor 360 may include a proximity sensor, an illumination sensor 142, a touch sensor, an acceleration sensor, a magnetic sensor, a gravity sensor (G-sensor), a gyroscope sensor, a motion sensor, an RGB sensor, an infrared sensor (IR sensor), a finger scan sensor, an ultrasonic sensor, an optical sensor, and the like, but are not limited thereto.

The driving unit 370 may perform mechanical or electrical operations required for driving the home appliance. Herein, it is described that the driving unit 370 refers to a part that provides mechanical movement or electrical movement required for driving of various home appliances (a washing machine, a refrigerator, a robotic vacuum cleaner, and the like) described below.

For example, in the case where the home appliance 300 is a washing machine, the driving unit 370 may be a motor for driving a washing tub. Alternatively, in the case where the home appliance 300 is a refrigerator, the refrigerator may include a compressor as the driving unit 370.

Figure 5:
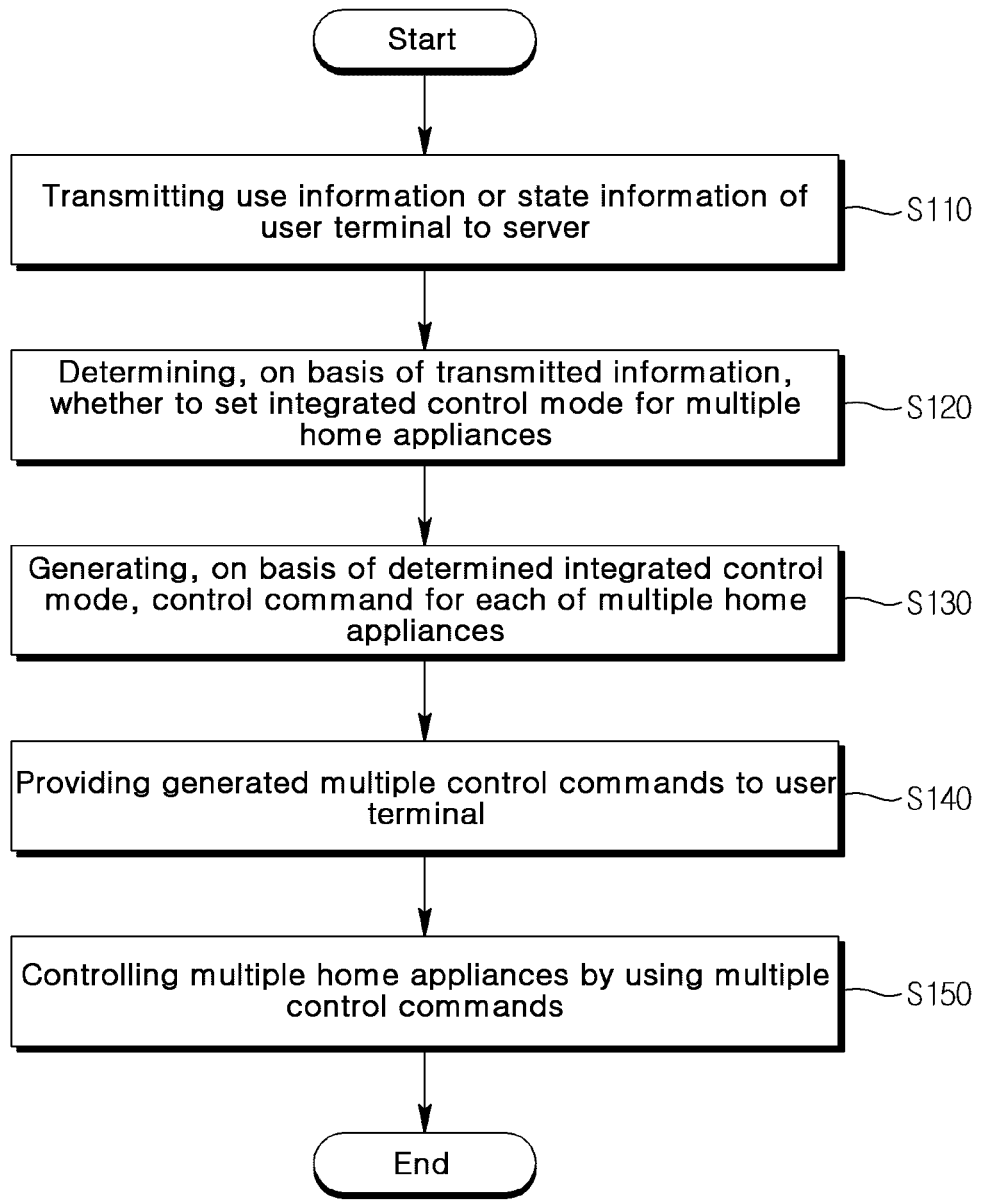
FIG. 5 is a flowchart showing an integrated control method for multiple home appliances using artificial intelligence according to several embodiments of the present disclosure.

FIG. 5 is a flowchart showing an integrated control method for multiple home appliances using artificial intelligence according to several embodiments of the present disclosure.

As will be described in more detail below, an integrated control method for multiple home appliances according to several embodiments of the present disclosure may be performed by the user terminal 100 and the server 200. For example, each step of the integrated control method for the home appliance may be performed by the processor 180 of the user terminal 100 and the processor 260 of the server 200.

Referring to FIG. 5, the use information or the state information of the user terminal 100 is transmitted to the server 200 at step S110.

The use information of the user terminal 100 may include a record of using the user terminal 100 by the user, specifically, mobile information. The mobile information may include the time when the user uses the user terminal 100, and a type of application used at the time.

The time when the user uses the user terminal 100 may refer to a use start time and a use end time for the user terminal 100. Information on the use start time and the use end time for the user terminal 100 may be transmitted to the server 200 later, and may be used in generating patterned-use information of the user.

The state information of the user terminal 100 may include, for example, position information of the user terminal 100. When the user moves while carrying the user terminal 100, the position information unit 115 of the user terminal 100 acquires position of the user terminal 100.

In addition to the position information, the user terminal 100 may record environment information around the user terminal 100. The environment information may include, for example, temperature, atmospheric pressure, humidity, or the like around the user terminal 100, but is not limited thereto.

The use information or the state information recorded by the user terminal 100 may be temporarily or non-temporarily stored in the memory 170. The user terminal 100 may transmit the stored use information or state information to the server 200 so that the server 200 determines whether to start the integrated control mode.

Afterwards, the server 200 determines, on the basis of the transmitted information, whether to set the integrated control mode for multiple home appliances at step S120.

By using the use information of the user terminal 100, the server 200 may determine whether to set the integrated control mode, and the type of integrated control mode to be set. The server 200 may pattern the time when the user starts using the user terminal 100 and the time when the user ends using the user terminal 100, and may estimate the wake-up time or the bedtime of the user by using the patterned time when the user terminal 100 is used.

By using the estimated wake-up time or bedtime, the server 200 may determine whether to set the integrated control mode to a wake-up mode or a sleep mode.

In this regard, estimation of the wake-up/sleep mode will be described with reference to FIG. 6 as an example.

Figure 6:
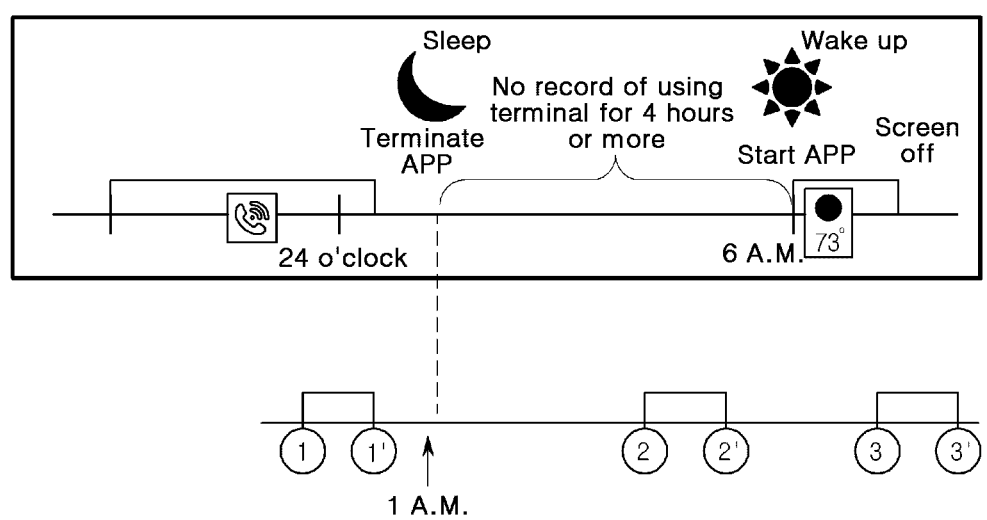
FIG. 6 is a diagram showing that an integrated control system for multiple home appliances using artificial intelligence according to several embodiments of the present disclosure estimates user's wake-up time and bedtime.

FIG. 6 is a diagram showing that an integrated control system for multiple home appliances using artificial intelligence according to several embodiments of the present disclosure estimates user's wake-up time and bedtime.

Referring to FIG. 6, the wake-up time and the bedtime of the user, and the time when the user uses the user terminal 100 are shown.

In FIG. 6, the numerals 1, 2, and 3 denote the times when the user start using the user terminal 100, respectively, and the numerals 1', 2', and 3' denote the times when the user ends using the user terminal 100, respectively. For example, the numerals 1, 2, and 3 may refer to the time when the user turns the power of the user terminal 100 on, or the time when the user presses a power button in a sleep and standby state and wakes up the user terminal 100. Alternatively, the numerals 1, 2, and 3 may refer to the time when the user runs an application installed on the user terminal 100.

In the meantime, the numerals 1', 2', and 3' may refer to the times when the user presses the power button of the user terminal 100 to return the user terminal 100 into the sleep and standby state, or the time when the user terminates a particular application running on the user terminal 100.

The server 200 may pattern the time when the user starts using the user terminal 100 and the time when the user ends using the user terminal 100. Herein, the patterning may refer to determining the time when the user terminal 100 is used, in order to estimate the wake-up time and the bed time of the user.

For example, when an interval of a predetermined time or more occurs between the numeral 2, which is the use start time, and the numeral 1', which is the use end time, the numeral 1', which is the last use end time, is determined as the bedtime of the user. Herein, the numeral 2, which is the use start time, is determined as the wake-up time of the user.

The above-described determination of the bedtime and the wake-up time may be performed by the server 200 as described above, but no limitation thereto is imposed. Before transmitting the record of using to the server 200, the user terminal 100 may also determine the bedtime from the record of using the user terminal 100 by using the method described above with reference to FIG. 6.

When the interval between the numeral 2, which is the use start time of the user terminal 100, and the numeral 1', which is the use end time, is smaller than the predetermined time, an interval between the numeral 3, which is the subsequent use start time, and the numeral 2', which is the use end time, is compared. Similarly, after determining whether the interval is greater than the predetermined time, when the interval is greater than the predetermined time, the numeral 2', which is the use end time, is determined as the bedtime and the numeral 3, which is the use start time, is determined as the wake-up time.

As described above, when the wake-up time and the bedtime of the user are determined from the record of using the user terminal 100 by the user, the server 200 determines whether to start the integrated control mode for the home appliance, on the basis of the wake-up time and the bedtime.

When the determined wake-up time of the user comes, the server 200 sets the integrated control mode for the home appliance to the wake-up mode and starts the wake-up mode. Alternatively, when the determined wake-up time of the user comes, the server 200 sets the integrated control mode for the home appliance to the sleep mode and starts the sleep mode.

In other several embodiments, the integrated control mode for the home appliance may be started by receiving a mode through the user terminal 100. Herein, the user terminal 100 may provide the server 200 with integrated control mode start information so that the sleep mode or the wake-up mode starts. The server 200 immediately starts the sleep mode or the wake-up mode when input of the sleep mode or the wake-up mode is provided from the user terminal 100. Alternatively, the server 200 starts the mode when the wake-up time or the bedtime estimated through the above-described process comes.

In various embodiments of the present disclosure, the server 200 may use the use information of the home appliance 300 used by the user so as to determine whether to start the integrated control mode for the home appliance 300.

Specifically, it is assumed that the times when the user manipulates the home appliance 300 are denoted by letters a, b, c, and d, respectively. Herein, a method similar to that in which the wake-up time and the bedtime of the user are determined from the time when the user uses the user terminal 100 may be used.

When an interval between manipulation times is equal to or greater than a predetermined time, the server 200 classifies the last time when the home appliance 300 is manipulated, as the wake-up time, and classifies the previous manipulation time as the bedtime.

The server 200 may determine the wake-up time and the bedtime of the user by using both provided information on the time when the home appliance 300 is used and information on the time when the user terminal 100 is used.

For example, as described above, the use information of the user terminal 100 or the use information of the home appliance 300 may be classified as a set of data collected over several days. A statistical method may be used to estimate the wake-up time of the bedtime of the user by using such data.

That is, the wake-up time or the bedtime of the user is estimated by using the time when the user terminal 100 or the home appliance 300 is used, but if the time when the user terminal 100 is used is similar to the time when the home appliance 300 is used, a weight for the time is assigned. That is, if the last time when the user terminal 100 is used and the last time when the home appliance 300 is manipulated are similar in time, this is a sufficient basis for estimating the time as the bedtime of the user. Therefore, a weight may be further assigned thereto, and may be used for determining the wake-up time or the bedtime of the user.

In the meantime, the server 200 may determine the start of the integrated control mode from a record of the position information of the user terminal 100. When it is identified that the position of the user terminal 100 deviates from a predetermined position range for a predetermined time, it is determined that the user is out and start of an away mode of the integrated control mode is thus determined.

In several embodiments, when the user inputs start of the away mode through the user terminal 100, the server 200 immediately starts the away mode. Alternatively, after the away mode is input, when the position of the user terminal 100 deviates from a predetermined position for a predetermined time or longer, the server 200 starts the away mode.

The server 200 generates, on the basis of the determined integrated control mode, a control command for each of the multiple home appliances at step S130.

When whether to start the integrated control mode and the type thereof are determined in the previous step, the server 200 generates, on the basis of the determined integrated control mode, the control command for each of the multiple home appliances 300.

Referring back to FIG. 5, on the basis of the determined integrated control mode, a control command is generated for each of the multiple home appliances at step S130.

In one integrated control mode, the multiple home appliances are controlled by the multiple control commands, respectively. Accordingly, the server 200 may generate multiple control commands for the multiple home appliance, respectively, according to the determined integrated control mode.

The multiple home appliances for which the control commands are generated by the server 200 may be previously registered in the use account. That is, if the home appliances used by the user are previously registered in the user account, the server 200 accesses the account and loads a list of stored home appliances. The server 200 may generate the multiple control commands for the multiple home appliances by using the loaded list of the home appliances and the determined integrated control mode.

Figure 7:
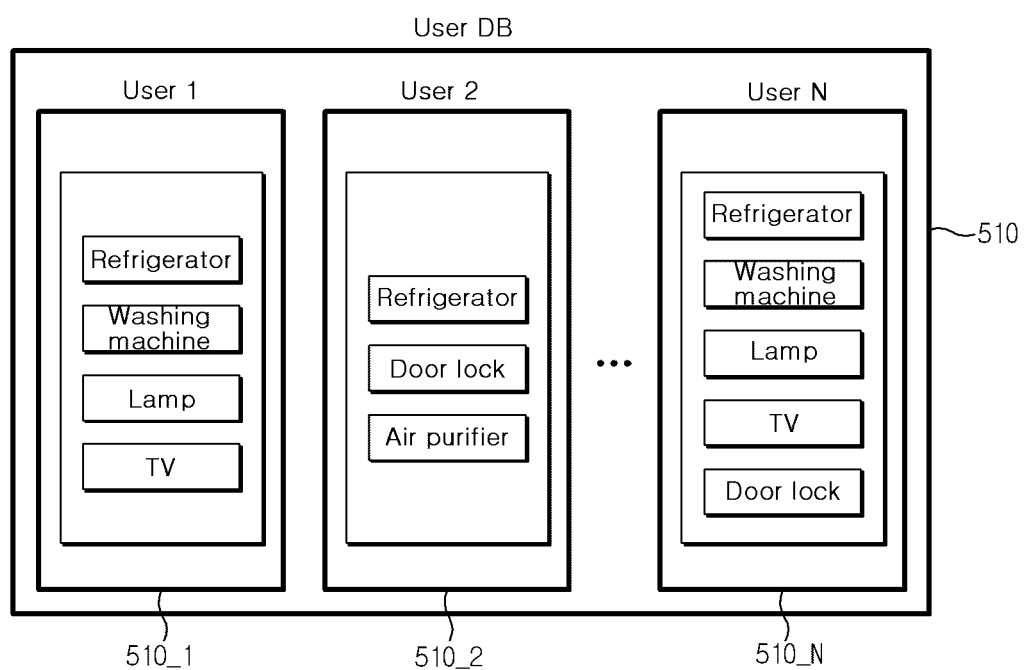
FIG. 7 is a diagram showing an example of a configuration of a user database stored in a server included in an integrated control system for multiple home appliances according to several embodiments of the present disclosure.

FIG. 7 is a diagram showing an example of a configuration of a user database stored in a server included in an integrated control system for multiple home appliances according to several embodiments of the present disclosure.

Referring to FIG. 7, the server 200 stores a user account and a user database related thereto.

The user database 510 may be stored in the storage 250 of the server 200. However, the present disclosure is not limited thereto. The user database 510 may be stored in another server connected to the server 200 over the network 500.

The user database 510 may contain data related to a user account. Each user may own a user account on the server 200, and may access data stored in the user account by logging in to its account. FIG. 7 shows an example that the user database 510 stores accounts 510_1 to 510_N of user 1 to user N.

In the user account, a list of home appliances registered in the user account by each user may be stored. FIG. 7 shows an example that information of a refrigerator, a washing machine, a lamp, and a TV is registered in the account 510_1 of the user 1 and information of a refrigerator, a door lock, and an air purifier is registered in the account 510_2 of the user 2.

The home appliances registered in the user account refer to home appliances that the user may use. That is, the home appliances are home appliances that may operate by receiving multiple control commands in the integrated control mode started by the server 200.

For example, when the determined integrated control mode is the wake-up mode, control commands for modes which may be used in the morning are generated for the respective home appliances. In addition, when the integrated control mode is the sleep mode, control commands for modes which may be used in the evening or at night are generated for the respective home appliances.

When the multiple control commands are generated, the generated multiple control commands are provided to the user terminal 100 at step S140 and the user terminal 100 controls the multiple home appliances 300 by using the multiple control commands at step S150. In this regard, a more detailed description will be given with reference to FIGS. 8 and 9.

Figure 8:
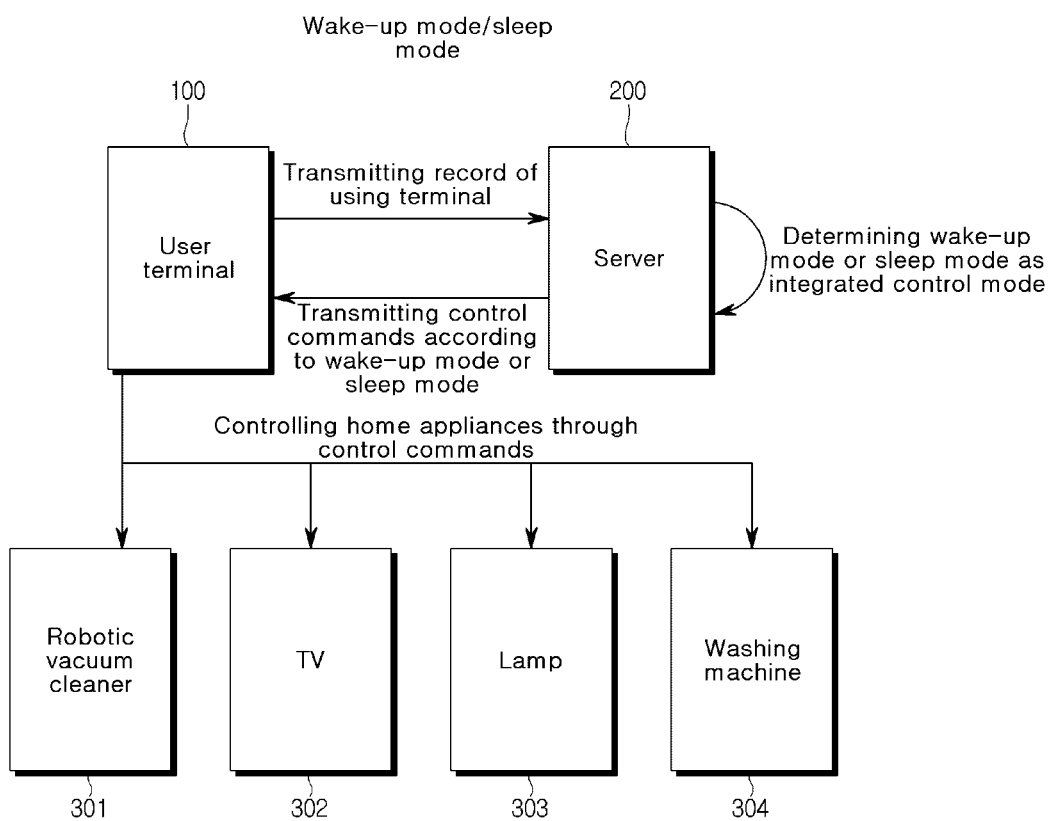
FIG. 8 is a diagram showing that an integrated control system for multiple home appliances according to several embodiments of the present disclosure controls multiple home appliances in a wake-up mode and a sleep mode.

FIG. 8 is a diagram showing that an integrated control system for multiple home appliances according to several embodiments of the present disclosure controls multiple home appliances in a wake-up mode and a sleep mode.

Referring to FIG. 8, when the record of using the user terminal is provided from the user terminal 100 to the server 200, the server 200 determines to set the integrated control mode to the wake-up mode or the sleep mode, by using the record of using. When the server 200 determines to start the integrated control mode into the wake-up mode or the sleep mode, the server 200 generates control commands appropriate for the respective home appliances 301 to 304 and provides the control commands to the user terminal 100.

The control commands corresponding to the integrated control mode set by the server 200 may be previously stored in the storage 250 of the server 200. The server 200 may load, on the basis of the determined type of integrated control mode, the control command corresponding to the integrated control mode from the storage 250, and may provide the control command to the user terminal 100.

When the wake-up mode is determined as the integrated control mode, a robotic vacuum cleaner 301, a TV 302, a lamp 303, and a washing machine 304 are controlled in such a manner that the power thereof is turned on to start operating.

Although not shown, home appliances may be controlled so that the power of a toaster or a blender is turned on to help the user prepare for breakfast according to the wake-up mode.

In the meantime, when the sleep mode is determined as the integrated control mode, the robotic vacuum cleaner 301, the TV 302, and the lamp 303 are controlled in such a manner that the power thereof is turned off to stop the operating. In the case of the washing machine 304, the washing machine 304 may be controlled according to the sleep mode in such a manner as to operate in a low-noise mode.

Although not shown, a latching device of the door lock may be set into double lock according to the sleep mode.

As described above, when the wake-up mode or the sleep mode is set as integrated control mode by the server 200, the server 200 provides multiple control commands for the respective home appliances 301 to 304 and integrally controls the home appliances 301 to 304. Accordingly, depending on the user's use environment, the multiple home appliances may be controlled simultaneously.

In various embodiments of the present disclosure, the integrated control mode set by the server 200 may have priority over an operation mode preset in the multiple home appliances 301 to 304. That is, before the integrated control mode is started by the server 200, the power of the multiple home appliances 301 to 304 may be turned on and the multiple home appliances 301 to 304 may operate according to a particular operation mode.

When the type of integrated control mode is determined by the server 200 and control commands are generated for the multiple home appliances 301 to 304, operation modes previously set for the home appliances 301 to 304 are ignored and operations of the home appliances 301 to 304 are set by the control commands generated according to the integrated control mode.

For example, in the case of the washing machine 304 operating in a normal operation mode, a low-noise operation may have priority due to the start of the sleep mode.

Figure 9:
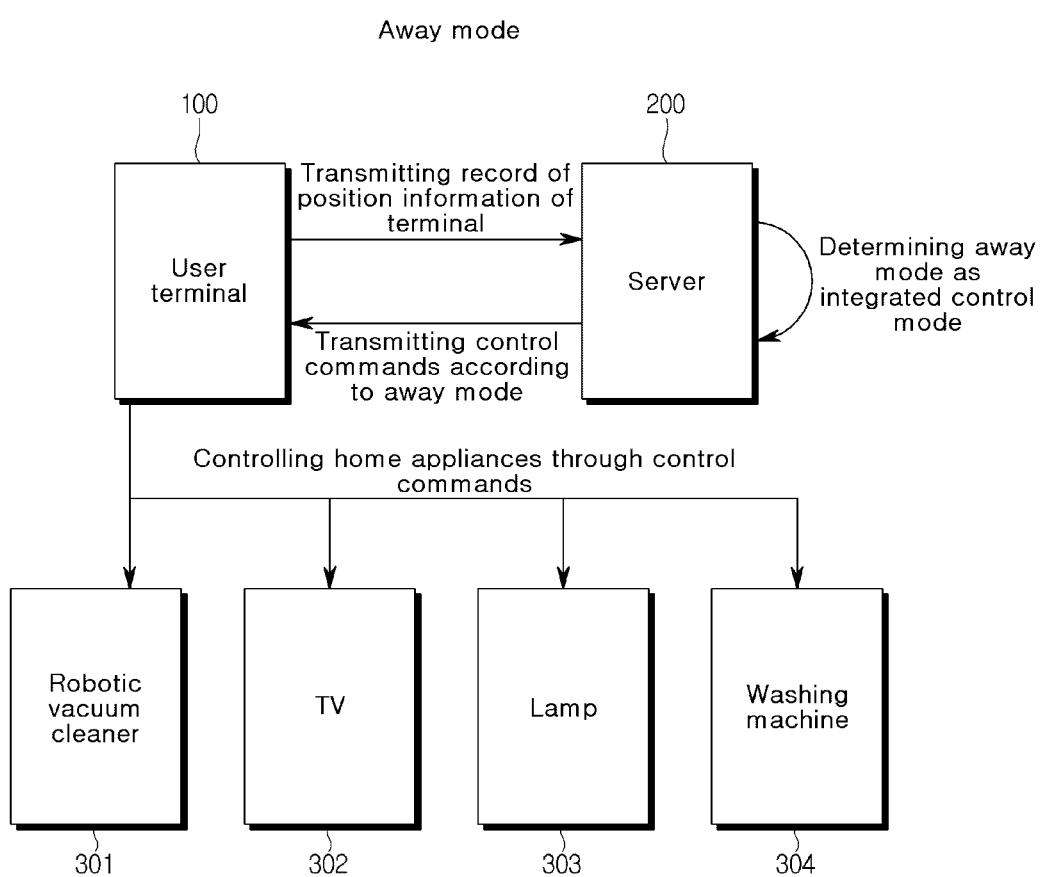
FIG. 9 is a diagram showing that an integrated control system for multiple home appliances according to several embodiments of the present disclosure controls multiple home appliances in an away mode.

FIG. 9 is a diagram showing that an integrated control system for multiple home appliances according to several embodiments of the present disclosure controls multiple home appliances in an away mode.

Referring to FIG. 9, when a record of the position information of the user terminal is provided from the user terminal 100 to the server 200, the server 200 determines to set the integrated control mode to the away mode, by using the record. When the server 200 determines to start the integrated control mode into the away mode, the server 200 generates control commands appropriate for the respective home appliances 301 to 304 and provides the control commands to the user terminal 100.

The server 200 may load the control command corresponding to the away mode from the storage 250, and may provide the control command to the user terminal 100.

When the away mode is determined as the integrated control mode, the TV 302, the lamp 303, and the washing machine 304 are controlled in such a manner that the power thereof is turned off to stop the operating. In the case of the robotic vacuum cleaner 301, the power of the robotic vacuum cleaner 301 is turned on to start operating so that the robotic vacuum cleaner 301 cleans the home while the user is out.

Although not shown in FIG. 9, the latching device of the door lock may be set into a double lock mode.

Figure 10:
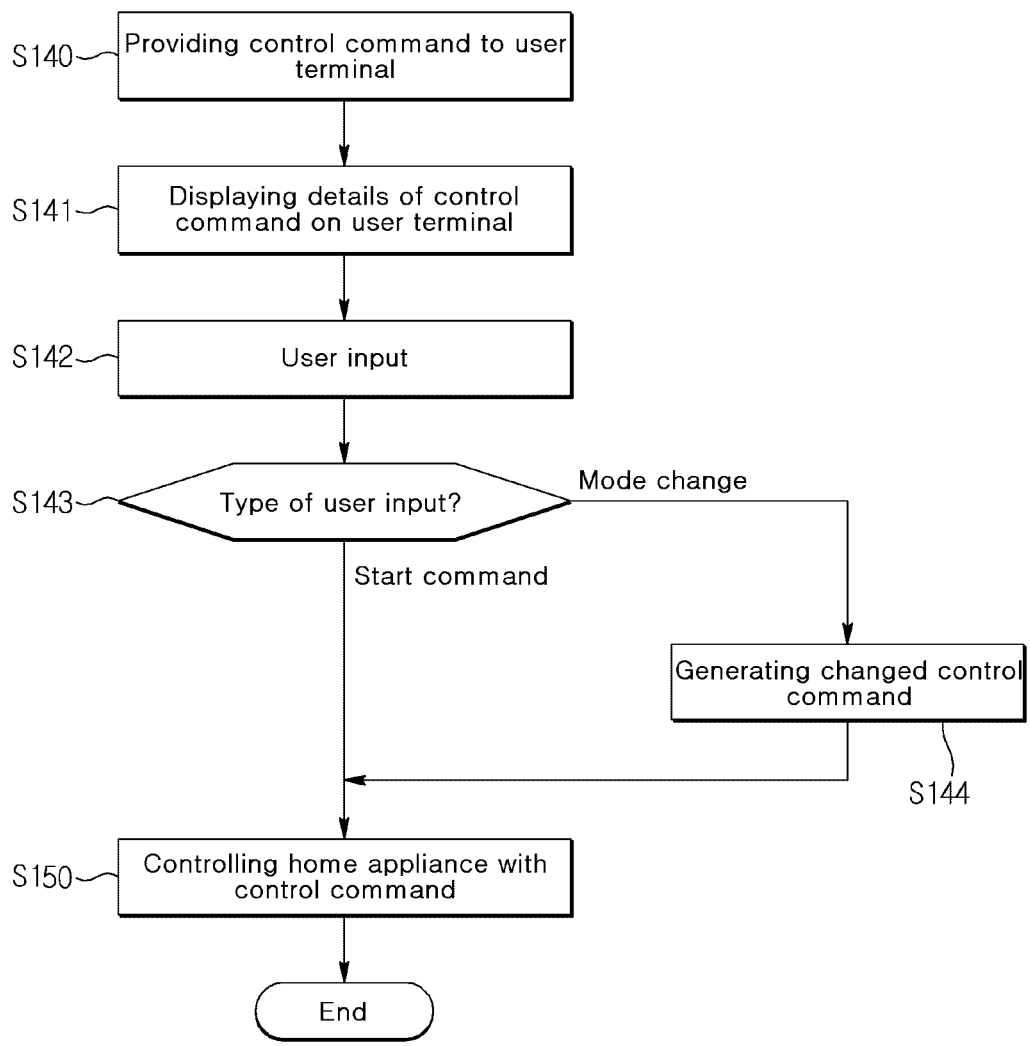
FIG. 10 is a diagram showing an integrated control method for multiple home appliances after a control command is provided to a user terminal of the present disclosure.

FIG. 10 is a diagram showing an integrated control method for multiple home appliances after a control command is provided to a user terminal of the present disclosure.

Referring to FIG. 10, the integrated control method for the home appliance may include providing a control command to the user terminal at step S140, and then displaying details of the control command on the user terminal at step S141.

The user terminal 100 displays the details of the control command provided from the server 200, through the display unit 151. The control command is a control command generated for each of the multiple home appliances 300. The display unit 151 may display the determined type of integrated control mode, and operations to be performed by the multiple home appliances 300 according to the integrated control mode.

Afterwards, a user input is provided to the user terminal 100 at step S142. The user input may be provided through the input unit 120, the interface unit 160 of the user terminal 100, or the like.

Afterwards, the type of user input of the the user terminal 100 is determined at step S143. As a result of determination, when the user input is a start command for starting the home appliance 300, the home appliance is controlled with the control command at step S145. When the user input is an input for changing the integrated control mode for the home appliance, a changed control command corresponding to the changed integrated control mode is generated at step S144. The user terminal 100 may control the home appliances 300 by generating the changed control command.

In several embodiments, the user terminal 100 may make a request to the server 200 for a control command in order to generate a control command corresponding to the changed control command. When there is the request from the user terminal 100, the server 200 generates control commands for the multiple home appliances corresponding to the changed integrated control mode, and transmits the control commands to the user terminal 100.

Afterwards, the home appliances are controlled by using the control commands generated according to the changed integrated control mode at step S150.

In the integrated control method for the home appliance according to several embodiments of the present disclosure, the type of integrated control mode provided to the home appliance 300 may be changed by using the received user input. Corresponding to the changed type of integrated control mode, a changed control command is generated from the user terminal 100 or the server 200, and the control command is provided to the home appliance 300.

This case is a situation where the user wants an integrated control mode for the home appliance different from the mode suggested by the server 200 or the user terminal 100, and thus inputs the integrated control mode to be changed, to the user terminal 100. The user terminal 100 may transmit information on the modified integrated control mode to the server 200.

In several embodiments, the server 200 may learn the user's preference characteristics for integrated control of home appliances on the basis of the changed integrated control mode. The server 200 may learn the modified integrated control mode, and may generate or modify a user preference characteristic learning model for integrated control of home appliances. For example, by using the artificial neural network 231*a*, the server 200 may learn the user's preference characteristics for integrated control of home appliances.

The generated preference characteristic learning model for integrated control of home appliances for the user may be stored in the user database 510. When the server 200 determines the integrated control mode for multiple home appliances on the basis of the record of using or the state information provided from the user terminal 100, the integrated control mode to which the user preference characteristic learning model for integrated control of home appliances is applied is generated. Through this, the multiple home appliances 300 are controlled by determining an integrated control mode appropriate for user's preference characteristics, thereby enhancing the user experience of the home appliances 300.

The present disclosure described above may be implemented as computer-readable code on a medium in which a program is recorded. A computer-readable medium includes all types of recording devices in which data readable by a computer system is stored. Examples of the computer-readable medium include a hard disk drive (HDD), a solid-state disk (SSD), a silicon disk drive (SDD), ROM, RAM, CD-ROM, a magnetic tape, a floppy disk, an optical data storage device, and the like. In addition, the computer may include the processor 180 of the terminal.

The embodiments of the present disclosure have been described above with reference to the accompanying drawings, but those skilled in the art will understand that the present disclosure may be implemented in other specific forms without changing the technical idea or essential characteristics of the present disclosure. Therefore, it should be understood that the embodiments described above are illustrative in all aspects and not restrictive.

What is claimed is:

1. An integrated control method for multiple home appliances using artificial intelligence, the method comprising:
   transmitting use information of a user terminal to a server;
   determining, by the server, a type of an integrated control mode and whether to start the integrated control mode for the multiple home appliances which are registered in a user account and cooperate over a network based on the transmitted information;
   generating, by the server, multiple control commands for the multiple home appliances, respectively, based on the determined type of the integrated control mode;
   providing, by the server, the multiple control commands to the user terminal; and
   controlling, by the user terminal, the multiple home appliances based on the multiple control commands over the network, respectively,
   wherein the transmitting of the use information of the user terminal to the server comprises patterning, by the user terminal, information on a time when the user terminal is used to generate patterned information and providing the patterned information to the server, and
   wherein the information on the time when the user terminal is used includes mobile information representing a time when a user uses the user terminal and a type of application of the user terminal used at the time.

2. The method of claim 1, wherein
the determining of the type of the integrated control mode comprises determining the type of the integrated control mode to be a wake-up mode or a sleep mode based on the patterned information.

3. The method of claim 2, wherein the information on the time when the user terminal is used further includes
   use information of the multiple home appliances that the user uses.

4. The method of claim 3, wherein the patterning of the information on a time when the user terminal is used comprises estimating a wake-up time or a bedtime from the mobile information and comparing the wake-up time or the bedtime estimated from the mobile information with a wake-up time or a bedtime estimated from the use information of the multiple home appliances.

5. The method of claim 1, wherein the state information of the user terminal includes position information of a user, and
   the determining of the type of the integrated control mode and whether to start the integrated control mode comprises starting an away mode when the user terminal deviates from a predetermined position for a predetermined time or longer based on the position information of the user.

6. The method of claim 1, wherein the controlling, by the user terminal, of the multiple home appliances based on the multiple control commands comprises setting operations according to the control commands as ignoring existing operation modes set before the multiple control commands are provided.

7. The method of claim 1, wherein the controlling, by the user terminal, of the multiple home appliances based on the multiple control commands comprises:
   receiving a user input by using the user terminal;
   determining whether the user input is an input for changing the determined type of the integrated control mode;
   generating, when a result of the determination is that the user input is the input for changing the integrated control mode, multiple control commands corresponding to a changed integrated control mode; and
   controlling the multiple home appliances with the generated multiple control commands.

8. The method of claim 7, wherein the server generates or modifies, based on the changed integrated control mode, a user preference characteristic learning model for the integrated control mode for the multiple home appliances.

9. A non-transitory computer-readable recording medium storing a computer program to execute the method of claim 1.

10. A system for integrated control of multiple home appliances using artificial intelligence, the system comprising:
    a user terminal configured to record use information of the user terminal; and
    a server configured to receive a record of the use information from the user terminal and determine a type of the integrated control mode and whether to start the integrated control mode for the multiple home appliances which are registered in a user account and cooperate over a network based on the record of the use information or the state information, wherein the server generates, based on the determined type of the integrated control mode, multiple control commands for the multiple home appliances, respectively, and provides the multiple control commands to the user terminal, wherein the user terminal controls the multiple home appliances based on the multiple control commands over the network, respectively, wherein the user terminal patterns information on a time when the user terminal is used to generate patterned information and provides the patterned information to the server, and wherein the information on the time when the user terminal is used includes mobile information representing a time when a user uses the user terminal and a type of application of the user terminal used at the time.

11. The system of claim 10, wherein the server determines the type of the integrated control mode to be a wake-up mode or a sleep mode based on the patterned information.

12. The system of claim 11, wherein the information on the time when the user terminal is used further includes use information of the multiple home appliances that the user uses.

13. The system of claim 12, wherein the user terminal estimates a wake-up time or a bedtime from the mobile information, and compares the wake-up time or the bedtime estimated from the mobile information with a wake-up time or a bedtime estimated from the use information of the multiple home appliances, thereby patterning the use information of the user terminal.

14. The system of claim 10, wherein the state information of the user terminal includes position information of a user, and the server starts an away mode when the user terminal deviates from a predetermined position for a predetermined time or longer based on the position information of the user.

15. The system of claim 10, wherein the user terminal sets operations according to the multiple control commands as ignoring existing operation modes set for the multiple home appliances before the multiple control commands are provided.

16. The system of claim 10, wherein the user terminal receives a user input, determines whether the user input is an input for changing the determined type of the integrated control mode, generate, when a result of the determination is that the user input is the input for changing the mode, multiple control commands corresponding to a changed integrated control mode and controls the multiple home appliances with the generated multiple control commands over the network, respectively.

17. The system of claim 16, wherein the server generates or modifies, based on the changed integrated control mode, a user preference characteristic learning model for the integrated control mode for the multiple home appliances.

\* \* \* \* \*